Patented July 2, 1946

2,403,143

UNITED STATES PATENT OFFICE 2,403,143

COMPOSITION FOR EFFECTING AGGLOMERATION OF SOLIDS IN AQUEOUS SUSPENSIONS

Richard Tutt, Jr., John R. Hubbard, and Charles R. McKee, Gowanda, N. Y., assignors to Peter Cooper Corporations, Gowanda, N. Y.

No Drawing. Application November 21, 1944, Serial No. 564,559

7 Claims. (Cl. 252—181)

This invention relates to compositions for effecting the agglomeration of solids in aqueous suspensions, preliminary to the removal or recovery of the solids.

By agglomeration we mean the balling or holding together, the flocculation, the precipitating, the flotation or setting of the originally suspended solids, thereby permitting separation of the solids from the aqueous medium by means or methods well known in the trade.

Previous methods for agglomeration of solids suspended in aqueous mediums are largely concerned with the chemical formation of an auxiliary floc within the system, resulting primarily in a physical entanglement of the suspended solids within the floc. This general procedure is commonly followed in the treatment of raw water and/or industrial wastes where by the addition of alums, copperas or other iron compounds to the aqueous suspensions of solids, a gelatinous floc of aluminum or iron hydroxides is formed under controlled pH conditions, resulting in the occlusion or entanglement of the suspended solids with the floc. The resultant floc-solids combination is then settled out, filtered, or floated as is desired, depending on the equipment used.

Another method, not as well known as the chemical floc, comprises the addition of a colloid such as animal glue to the suspension of solids, resulting in an agglomeration of the solids through neutralizing the electrical charges of like nature carried by the individual particles in aqueous suspension. In this method, it is generally understood that in a given system of an aqueous suspension of solids, each particle carries an electrical charge and that the charges are all of like polarity, either positive or negative, and that the stability of the suspension is dependent upon the mutual repulsion of the individual particles bearing like charges. If the charges are neutralized, agglomeration, precipitation, flocculation, flotation, or settling of the solids will result. This procedure has been successfully used in agglomerating raw or process waters carrying clay, silica and silt materials, by adding a one per cent solution of animal glue to the system at the rate of about one gallon per 1000 gallons of suspension. An agglomeration of solids takes place which results in settling of the solids. The success of this process is dependent on the amphoteric nature of animal glue, i. e., its ability to absorb or adsorb relatively large electrical charges, either positive or negative, depending on the pH control. The pH of the system in the case of this suspension is generally in the range of 4.2 to 5.5 or is brought to this range by the use of caustic alkalis, acids, alums, etc. as the case may require. Animal glue in this pH range is nearly iso-electric, bearing no charge or a balance of positive and negative charges, and in such a state is capable of adsorbing either positive or negative charges carried by the individual particles of the suspension. On adding the animal glue, as in the above example, the glue colloid apparently adsorbs the electrical charges present on the individual particles resulting in a neutralizing of the particle charges, thus destroying the stability of the suspension and permitting the particles to agglomerate. It is known, as well, that the presence of trivalent aluminum, iron and/or chromium ions in the original aqueous suspension of solids is required for effective action. If, from the nature of the suspension, insufficient of such ions are present, it is customary to add such ions for a so-called mordanting effect. Under the usual controls such additions are not by themselves sufficient to promote the formation of a chemical floc.

This use of animal glue as an auxiliary agglomerating agent has not met with widespread use, due to a number of factors; the action is at times sluggish; for best results the glue solution must be corrected to a pH of 4.7 (iso-electric point), a critical control; the prepared auxiliary glue solution must be aged for 24 hours at temperatures preferably below 65° F. for proper "ripening" to insure adequate reactivity; the aqueous suspension of solids must be properly balanced as to pH and mordant; the versatility of the auxiliary glue solution was not great under fluctuating conditions of the aqueous suspension of solids. The "ripening" of the auxiliary glue solution by aging for 24 hours at a cool temperature and in a quiet state is believed to result in the development of larger, more hydrated colloidal glue particle structure, which in some manner promotes more effective reactive results.

One of the objects of this invention is to provide an improved agglomerating solution which overcomes the objections of prior art solutions. Another object is to provide an improved glue solution for effecting agglomeration and which requires no aging. A further object is to provide an improved solution of this type which acts much more rapidly and positively on a suspension than prior art agglomerators. It is also an object to provide an improved agglomerating solution which can be relied upon to produce the desired effect on a suspension under varying conditions of the suspension.

Other objects and advantages of this invention will appear from the following description and claims.

We have found that the reactivity of an animal glue auxiliary agglomerating solution can be markedly increased in intensity and effect if a moderately strong negative charge is induced upon the glue colloid before addition of the solution to an aqueous suspension of solids mordanted in the usual manner and that the induced negative charge is still more effective if the glue colloid is maintained at its maximum point of hydration. These conditions are easily effected by the addition of sufficient alkaline materials to approximately a 1% animal glue solution to give a resultant pH in the range of 8.0 to 10.0. A pH of 8.5 is especially effective with many glues tested. For our purposes, we prefer the use of caustic soda or potash as the alkaline medium, due to low cost, availability, and ease of handling. Ammonia, borax, silicate of soda, lime water, sodium carbonate, trisodium phosphate and other alkalies may be used for this purpose although the carbonates and phosphates are not as effective as the others due possibly to a depressing action on the glue hydration and/or other side reactions. The amount of alkaline material required to fulfill the above conditions will vary, depending on the hardness and pH of the water used. The maximum hydration of the animal glue colloid is found in the pH range of 8.0 to 10.0, depending on the previous case history of the particular glue (manufacturing process and raw stock). The preferred pH control for optimum results for a given type or commercial source of animal glue is easily found by simple practical laboratory trials and offers no difficulty.

We have found that the further addition of a mildly alkaline colloid selected from a group consisting of rosin size, rosin soap, sodium resinates and other water soluble commercial soaps to the glue solution, serves to increase the effectiveness and versatility of the agglomerator under many conditions of practical use. The function of the mildly alkaline soap-like colloid is not completely understood, and although it appears to impart a slightly more pronounced agglomerating action, its main function appears to aid in the coalescing of the agglomerated particles, promoting easier subsequent settling, filtering, or flotation, approximately from 3% to 12% (dry basis) of this alkaline colloid, based on the dry weight of the glue may be used. The term "mildly alkaline water-soluble soap-like colloid" is herein used to include rosin size, rosin soap, sodium resinates and water-soluble commercial soaps.

The auxiliary glue composition so prepared gives a glue solution wherein the highly hydrated glue colloid carries a negative charge of considerable magnitude. The addition of small quantities of this composition to a mordanted aqueous suspension of solids in a pH range of approximately 4.0 to 6.0, results in an immediate agglomeration of the solids, promoting efficient clarification of the suspension. It is believed that the magnitude of the negative electrical charge carried by the highly hydrated glue colloid neutralizes the positive charges carried by the suspended particles and that this mutual neutralization of charges is dependent in some manner on the presence of the mordant with the solids suspension. Apparently this neutralizing of the positive charges upon the suspended particles upsets the stability of the suspension, thereby promoting agglomeration.

This preferred auxiliary agglomerating glue solution is ready for immediate use after preparation, since it requires no aging or ripening period for development of reactivity as is required with previous auxiliary agglomerating glue solutions. This improved feature is of commercial importance, as it permits rapid preparation and use of the solution as needed, and eliminates the need for extra storage tanks previously required for aging of the solution.

This preferred auxiliary agglomerating glue solution provides a sharper, more effective agglomeration of the suspended solids than the previously known compositions, thus providing for a clearer effluent and a higher efficiency of solids recovery.

This preferred auxiliary agglomerating glue solution possesses a greater versatility in effective use over a far wider range of variable conditions and properties of the suspension of solids than heretofore possible with previously known agglomerating solutions of animal glue. This characteristic is desirable as it is well known that systems of solid suspensions vary constantly in commercial operations as to total solids, percentage of mordant, pH, etc.

The following formulas illustrate by way of examples a few embodiments of this invention. The exact quantities of alkalies required are subject to considerable variation, due to variation in pH of the glue and the hardness of the particular water used. On completion, the pH of the auxiliary agglomerating solution should fall in the pH range of 8.0 to 10.0, the amount of alkali being adjusted to accomplish this end:

(1)

| | | |
|---|---|---|
| Glue | pounds | 100 |
| Caustic soda or caustic potash | do | 0.5 to 3.0 |
| Water | gallons | 1,200 |

(2)

| | | |
|---|---|---|
| Glue | pounds | 100 |
| Borax | do | 4 to 8 |
| Water | gallons | 1,200 |

(3)

| | | |
|---|---|---|
| Glue | pounds | 100 |
| Calcium oxide (lime) | do | 4 to 8 |
| Water | gallons | 1,200 |

(4)

| | | |
|---|---|---|
| Glue | pounds | 100 |
| Trisodium phosphate | do | 7 to 12 |
| Water | gallons | 1,200 |

(5)

| | | |
|---|---|---|
| Glue | pounds | 100 |
| Ammonia (as NH₃) | do | 2 to 4 |
| Water | gallons | 1,200 |

(6)

| | | |
|---|---|---|
| Glue | pounds | 100 |
| Silicate of soda | do | 1 to 3 |
| Water | gallons | 1,200 |

(7)

| | | |
|---|---|---|
| Glue | pounds | 100 |
| Soda ash | do | 1 to 3 |
| Water | gallons | 1,200 |

(8)

| | | |
|---|---|---|
| Glue | pounds | 100 |
| Rosin size or mildly alkaline soap | pounds | 10 |
| Caustic soda | do | 3 |
| Water | gallons | 1,200 |

To each of formulas 1, 2, 3, 4, 5, 6, and 7, 3 to 12 pounds rosin size, sodium resinates, or commercial soap (all on a dry basis) may be added.

In preparing the above compositions, the animal glue preferably is first soaked in an excess of cold water until soft (1 pound dry glue per gallon of water), then melted at 140° F., and diluted out with approximately 70% of the formula weight of water in a suitable storage tank. The diluted rosin size, sodium resinate, or soap is added (if to be used), followed by a dilute solution of the alkaline material, and finally, the balance of the water required to satisfy the formula is added. Three quarts of formalin per 1000 gallons of solution may be added as a preservative.

In the case of Formula 3, the lime, on being added to water, forms calcium hydroxide, which is completely soluble in the 1,200 gallons of water in the preparation.

The following examples will serve to demonstrate the practical use of the improved agglomerating solutions:

*Example I*

In the manufacture of paper, a dilute suspension of fibers and fillers (approximately 0.75% to 1.50% concentration of solids) is fed to the Fourdrinier wire or cylinder of the paper making machine, the paper web being formed upon the wire or cylinder by a felting action of the fibers and fillers and the excess water and small sized fillers and fibers pass through the screen as "white water," which is returned to the system for re-use. For best paper formation and even retention of the fillers, it is extremely desirable to hold as much of the filler and fiber on the wire or cylinder screen as is possible on the first pass of the fiber-filler suspension over the paper forming medium. This is especially true of the fine fibers which are most richly sized and whose retention in the sheet promotes increased strength and even formation. This is especially true of the fillers, as it is desired to hold a uniform ratio of filler to fiber upon the sheet for uniform opacity and quality of the paper sheet.

The addition of the preferred auxiliary agglomerating glue solution to the dilute fiber-filler suspension just before the suspension passes to the forming medium in the ratio of approximately 1 gallon per 1000 gallons of suspension promotes an immediate agglomeration of the fibers-fillers as they pass upon the forming medium. This agglomerating action ties in the fine and coarse fibers and fillers such that the efficiency of retention upon the forming medium is greatly increased, promoting a more even formation, a stronger sheet, a faster draining sheet, with minimum recirculation of white water solids.

*Example II*

In the recovery of fibers and fillers from those paper mill white waters which normally pass to settling tanks or to other commercial recovery systems or saveall, the use of the improved auxiliary agglomerating glue solution provides a highly effective means of speedily and efficiently recovering the fiber and fillers. To the white water as it enters the settling tank or other commercial recovery system, a small stream of the improved agglomerating composition is added. (Approximately 1 gallon per 1000 gallons of white water.)

An immediate agglomeration takes place promoting rapid settling of the fiber-solids, which are removed in the usual manner as, for example, the use of a continuous bottom scraper. The use of our improved agglomerating solution promotes faster and more complete agglomerating action and settling than if no auxiliary agent were used, or if straight animal glue were used as the agglomerating agent, thereby making more efficient use of the settling basins as to time and volume factors and permitting maximum recovery of valuable fibers and fillers. In place of settling tanks the white waters may be treated in like manner with our improved agglomerating agent and handled by any of the commercial separating devices. The use of our improved agglomerating solution is particularly desirable with apparatus of the kind which introduces finely divided air bubbles into the white water, the agglomerated fiber and filler being floated by air and removed by top scrapers on equipment occupying relative small space, with continuous action and providing in many cases an effluent carrying less than 0.5 pound of filterable solids per 1000 gallons of effluent.

The use of the improved agglomerating solution is also applicable in the treatment of process waters, such as the removal of muds in the washing of sands, permitting re-use of the clarified water. In this case, the auxiliary composition of matter is added to the muddy process water just before passing to large settling tanks of the type generally used in the trade. The agglomerating actions takes place at once, permitting the muds to settle rapidly, the clarified overflow effluent is then suitable for re-use in the continued washing of the sand.

In addition to the above examples, our improved agglomerating solutions are applicable to many other uses for separation of solids from liquids, such as to coal mine wastes, distillery wastes, sewage, tannery wastes, raw waters, process waters, and industrial wastes where the recovery of suspended solids or clarification of turbid waters for re-use is desired, or where prevention of stream pollution is an important factor.

We claim as our invention:

1. An agglomerating composition for use with a mordanted aqueous suspension of solids having a pH of approximately from 4.0 to 6.0, comprising an approximately 1% solution of animal glue in water, sufficient alkaline material to give a resultant pH of approximately 8.0 to 10.0, and a mildly alkaline water-soluble soap-like colloid, said colloid being present to the extent of from 3% to 12% dry basis based on the weight of glue.

2. An agglomerating composition for use with a mordanted aqueous suspension of solids having a pH of approximately from 4.0 to 6.0, comprising an approximately 1% solution of animal glue in water, and from 0.5% to 3.0% caustic alkali, based on the weight of the dry glue in the solution, and from 3% to 12% rosin size, dry basis and also based on the weight of said dry glue.

3. An agglomerating composition for use with a mordanted aqueous suspension of solids having a pH of approximately from 4.0 to 6.0, without appreciably changing the pH of said suspension comprising an approximately 1% solution of animal glue in water in which the negative electrical charges on the glue particles are increased by the addition of from 0.5% to 12.0% of an alkali selected from a group consisting of borax, calcium hydroxide, ammonia, trisodium phosphate, silicate of soda, soda ash, sodium hydroxide, potassium hydroxide and sodium carbonate sufficient to give a resultant pH of 8.0 to 10.0.

4. An agglomerating composition for use with a mordanted aqueous suspension of solids having a pH of approximately from 4.0 to 6.0, comprising an approximately 1% solution of animal glue in water, from 0.5% to 12.0% (as required) of an alkali selected from a group consisting of borax, calcium hydroxide, ammonia, trisodium phosphate, silicate of soda, soda ash, sodium hydroxide, potassium hydroxide and sodium carbonate, and from 3% to 12% of rosin size.

5. A composition for effecting agglomeration of a mordanted slightly acid suspension of solids in a liquid, to facilitate the removal of the solids from the liquid, said composition comprising an animal glue dissolved in water to form an approximately 1% protein solution, and from 0.5% to 12% alkaline material dissolved in said solution, sufficient to promote maximum hydration of the glue colloid and to impose on said protein negative electrical charges, which, when said solution is added to a suspension of solids in a liquid, neutralize the electrical charges of said solids and thereby cause agglomeration of the same without coagulation of said protein.

6. A composition for effecting agglomeration of a mordanted slightly acid suspension of solids having positive electrical charges, said composition including an approximately 1% animal glue solution and sufficient alkali to produce a solution having a pH in the range of 8.0 to 10.0 and to impose negative electrical charges on the glue protein, which negative charges neutralize the positive charges of said solids when said solution is added to said suspension, to cause agglomeration of said solids.

7. An agglomerating composition for use with a mordanted aqueous suspension of solids having a pH of approximately from 4.0 to 6.0, comprising a dilute solution of animal glue in water, sufficient alkali to give the solution a pH of approximately 8.0 to 10.0 and to impose negative electrical charges on said glue, and from 3% to 12% based on the dry weight of glue of a mildly alkaline water-soluble soap-like colloid which constitutes a coalescing agent for said solids.

RICHARD TUTT, Jr.
JOHN R. HUBBARD.
CHARLES R. McKEE.